3,697,470
Patented Oct. 10, 1972

3,697,470
N-ALKYL-N-ARYLHYDROXYLAMINES AS SHORT-STOPPING AGENTS AND POPCORN POLYMER INHIBITORS
Paul G. Haines, Lafayette Hill, Pa., and Harry Elmer Albert, deceased, late of Lafayette Hill, Pa., by Dorothy S. Albert, executrix, Lafayette Hill, Pa., assignors to Pennwalt Corporation, Philadelphia, Pa.
No Drawing. Filed May 21, 1969, Ser. No. 827,129
Int. Cl. C08d 5/02, 7/10
U.S. Cl. 260—29.7 N          7 Claims

ABSTRACT OF THE DISCLOSURE

N-alkyl-N-arylhydroxylamine is disclosed as a shortstopping agent in emulsion polymerizations and as an inhibitor or suppressor of the undesirable polymerization of olefinic monomers resulting in the formation of popcorn polymers.

BACKGROUND OF THE INVENTION

(1) Field of the invention

This invention relates to a composition of matter selected from the group consisting of:

(a) N-alkyl-N-arylhydroxylamine and an emulsion polymer system containing at least an addition polymer formed from a monomer capable of free radical polymerization and (b) N-alkyl-N-arylhydroxylamine and a monomer capable of free radical polymerization and processes for preparing said composition of matter.

(2) Description of the prior art

Additives called shortstopping agents are employed in emulsion polymerization processes in order to control the amount of solid polymer formed. Addition of a shortstopping agent to an emulsion polymerization run terminates polymer formation. Known shortstops include hydroquinone, alkyl dithiocarbamates, dinitrochlorobenzene, hydroxylamine and hydroxylamine salts. All of these compounds present problems as shortstopping agents, e.g., color or toxicity. N,N-dialkylhydroxylamines have been disclosed as shortstopping agents in U.S. Pat. 3,222,334.

Spontaneous polymerization of monomers, in monomer recovery systems or during storage, leads to insoluble, crosslinked polymers, which, because of their appearance, are known as popcorn polymers. Popcorn polymer formation is undesirable particularly in monomer recovery systems because it is deposited in places that are inaccessible and may require shutdown of expensive process equipment in order to remove built-up deposits. Accordingly, popcorn polymer inhibitors are widely sought.

A desirable popcorn polymer inhibitor exhibits, in addition to its inhibiting property, stability during storage and handling, some volatility so that it will be dispersed throughout monomer recovery systems, solubility in monomers so that it will disperse throughout the material it is sought to protect, does not introduce colored impurities into recovered monomers, and if carried over into polymerization processes, does not discolor the resulting polymers.

Few materials having the desired properties are known. Hydroxylamine is unstable, and it must be continuously replaced. Its salts are limited in solubility and are nonvolatile. Aromatic amines are generally unsatisfactory because they discolor easily and are inefficient.

The conventional closed system for the emulsion polymerization of butadiene with styrene requires both shortstopping agents and popcorn polymer inhibitors. The polymerization is performed in a conventional reaction vessel equipped with stirring means, heating and cooling means. Polymerization of monomers is allowed to proceed until a suitable degree of polymerization is achieved. This point is usually determined by the amount of polymer present in the latex. The polymerization is stopped by the addition of a suitable shortstopping agent. The latex is transferred to a flash tank at or slightly above atmospheric pressure where some of the gaseous butadiene is allowed to vaporize and is removed and liquefied for reuse. The latex is then passed to a vacuum flash tank where the remaining monomeric butadiene and styrene is removed. The temperature in the vacuum flash tank is maintained at 100° F. Popcorn polymer formation is often encountered in systems involving the vacuum flash tank because polymerizable monomers are present in the vapor state above the latex and throughout the lines of the monomer recover system. Radical sites are also present due to dissolved oxygen or voltailized initiator from the polymerization. These combined with the 100° F. temperature present ideal conditions for the formation of popcorn polymer. The latex is then passed through a styrene stripping column where steam is passed countercurrent to the latex removing styrene monomer. Popcorn polymer can also form in this styrene recovery system. Thus a popcorn polymer inhibitor must be added to the latex before or at least during the monomer recovery steps.

SUMMARY OF THE INVENTION

According to the present invention, a composition of matter is provided comprising (a) an emulsion polymer latex containing N-alkyl-N-arylhydroxylamine as a shortstopping agent and (b) a monomer polymerizable by free radical processes containing a minor amount of N-alkyl-N-arylhydroxylamine to stabilize it against popcorn polymer formation. The N-alkyl-N-arylhydroxylamine of this invention has the following formula

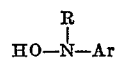

wherein R is an alkyl group containing 1 to about 18 carbon atoms, e.g., methyl, ethyl, propyl, isopropyl, butyl, sec-butyl, cyclopentyl, pentyl, octyl, and the like; and Ar is an aryl radical containing from about 6 to 20 carbon atoms, e.g., phenyl, tolyl, napthyl, anthryl, ethylphenyl, xylyl, trimethylphenyl, substituted napthyl, substituted anthryl, and the like.

More preferred are compounds wherein R is an alkyl radical containing 1 to 6 carbon atoms, e.g., methyl, ethyl, propyl, isopropyl, butyl, sec-butyl, isobutyl, ter-butyl, pentyl, cyclopentyl, cyclo-hexyl, and the like; and Ar is a phenyl or substituted phenyl, e.g., tolyl, xylyl, trimethyl phenyl, chlorophenyl, nitrophenyl, and the like.

The process of this invention comprises adding a minor amount of N-alkyl-N-arylhydroxylamine to an emulsion polymerization latex to terminate the polymerization reaction and thereby control the amount of solid polymer formed.

DETAILED DESCRIPTION OF THE INVENTION

Emulsion polymerization is a general technique for preparing polymers, i.e., polymers derived from the homopolymerization and copolymerization of vinyl monomers. Vinyl monomers as used here is a general term including both mono-olefins and diolefins. Examples of these monomers are: styrene, acrylic acid and esters, methacrylic acid and esters, vinyl acetate, butadiene, isoprene, chloroprene, alpha-methylstyrene, acrylonitrile, acrylamide, methacrylamide, and the like. It is apparent from the foregoing that the polymerization processes which can employ N-alkyl-N-arylhydroxylamines as a shortstopping agent are those involving monomers that are polymerizable by means of free radical processes.

The shortstopping agent is added when the desired degree of polymerization is reached. In synthetic rubber manufacture, e.g., styrene-butadiene rubbers, the polymerization is terminated when the latex contains about 60 percent solids. The amount of N-alkyl-N-arylhydroxylamine added to shortstop the polymerization can vary from 0.01 to about 2.0 parts per hundred parts of monomer (p.h.m.). Preferably from about 0.02 to about 1.0 (p.h.m.) is added.

The same hydroxylamine reported herein as a shortstopping agent has also been discovered to be effective as a popcorn polymer inhibitor. However, because the popcorn polymer inhibitor must be volatile enough to disperse throughout monomer recovery systems, preferable embodiments of this aspect of the invention reside in the lower molecular weight N-alkyl-N-arylhydroxylamines. As a general proposition, the lower molecular weight members of a generic group will have a lower boiling point and this property is desired in popcorn polymer inhibitors.

The amount of N-alkyl-N-arylhydroxylamine used as a popcorn polymer inhibitor ranges from 0.001 to about 5.0 percent by weight of the total monomers. Lesser amounts than the lower figure indicated herein tend to be ineffective while larger than 5.0 percent by weight does not offer any advantage.

The desirability of having both shortstopping and popcorn polymer inhibiting properties in N-alkyl-N-arylhydroxylamine is evident. Thus excess N-alkyl-N-arylhydroxylamine not consumed during the shortstopping of an emulsion polymerization is available to inhibit the formation of popcorn polymer during monomer recovery steps performed on the emulsion. As mentioned, popcorn polymer formation often occurs and is particularly troublesome in monomer recovery systems.

The following examples are cited to illustrate the invention. They are not intended to limit it in any manner.

EXAMPLE 1

Shortstopping emulsion polymerization with N-ethyl-N-phenylhydroxylamine

A sodium formaldehyde sulfoxylate receipe listed below is loaded into a 7 oz. bottle:

| | Parts by weight |
|---|---|
| Butadiene | 18 |
| Styrene | 7 |
| Water | 50 |
| t-Dodecyl mercaptan | 0.058 |
| Dresinate 515 [a] | 1.125 |
| Daxad 11 [b] | 0.038 |
| Versene 100 [c] | 0.008 |
| p-Menthane hydroperoxide [d] | 0.011 |
| $FeSO_4 \cdot 7H_2O$ | 0.0056 |
| $Na_3PO_4 \cdot 12H_2O$ | 0.20 |
| Sodium formaldehyde sulfoxylate | 0.0169 |

[a] Hercules Powder Co., potassium salt of disproportionated rosin acids, 80% solids. Amount given in recipe is on a 100% basis.
[b] Dewey and Almy Chemical Co., dispersing agent, sodium salt of polymerized alkylnaphthalene sulfonate.
[c] Dow Chemical Co., sequestering agent, tetrasodium salt of ethylene-diamine tetraacetic acid, 39% aqueous solution. Amount given in recipe is on a 100% basis.
[d] Hercules Powder Co., 50% active ingredient. Amount given is on a 100% basis.

The bottles are initially loaded with all of the ingredients except the p-methane hydroperoxide and then are capped with a perforated crown cap having a 3/16″ opening and a self-sealing rubber liner to allow catalyst injection and sampling of the latex with a hypodermic syringe as polymerization proceeds. The loaded bottles are placed in a thermostatically controlled polymerizer bath held at 5° C. They are positioned so that rotation of the shaft of the polymerizer rotates the bottles end over end to provide suitable agitation. After cooling in the polymerizer for about 10 minutes, a styrene soultion containing 1.1% by weight of p-menthane hydroperoxide is injected by a hypodermic syringe to initiate polymerization. The progress of the polymerization is followed by taking the total solids of latex samples obtained by using a hypodermic syringe, these total solids being related to the percent conversion of the monomers by a simple formula. At a conversion of about 55% the stopping agent is injected by a hypodermic syringe, a dilute, aqueous solution usually being employed for this purpose. The conversion is then determined after 1 hour at 5° C. and after 18 and 24 hours at 50° C. to determine the effectiveness of the stopping agent.

The results of evaluating N-phenyl-N-ethylhydroxylamine in this manner at concentrations of 0.02 to 0.15 part per hundred of monomer (p.h.m.) are summarized in Table I. These results show that this compound is a very effective stopping agent even at very low concentrations.

TABLE I.—N-PHENYL-N-ETHYLHYDROXYLAMINE AS A STOPPING AGENT

| | Percent conversion | | | |
|---|---|---|---|---|
| Concn., p.h.m. | When stopped | After 1 hr. at 5° C. | After 6 hrs. at 50° C. | After 24 hrs at 50° C. |
| Series 1: | | | | |
| 0 | 53.2 | 65.3 | 95.6 | 96.5 |
| 0.15 | 53.2 | 54.1 | 53.7 | 53.3 |
| Series 2: | | | | |
| 0.02 | 52.2 | 53.7 | 58.8 | 55.2 |
| 0.05 | 52.2 | 48.0 | 49.2 | 48.0 |
| 0 | 53.8 | 72.7 | 98.0 | 98.2 |

EXAMPLE 2

N-ethyl-N-phenylhydroxylamine as popcorn polymer inhibitor

The technique used for evaluating N-ethyl-N-phenylhydroxyamine as an inhibitor for popcorn polymer in the liquid phase involves flushing a 7-ounce beverage bottle with nitrogen, charging each bottle with 30 ml. of inhibitor-free styrene, 0.5 g. of popcorn polymer seed and a weighed amount of the popcorn inhibitor. The "seed" is activated just before usage by overnight exposure to a 100 watt incandescent lamp. The bottles are capped and 1 ml. of liquid butadiene is injected into each bottle with a hypodermic syringe through the self-sealing NBR synthetic rubber cap liner. The bottles are then placed in a constant temperature oven at 60° C. and are inspected periodically for the appearance of popcorn polymer. After popcorn growth started in each bottle it often proceeds rapidly, filling most of the free space in the bottle with white insoluble polymer having the appearance of popcorn. The time required for initiation of popcorn growth is recorded in each case. The results for N-phenyl-N-ethylhydroxylamine are summarized in Table II.

TABLE II

N-phenyl-N-ethylhydroxylamine as a popcorn polymer inhibitor in screening test

| Concn., p.h.m. | Time in days for popcorn polymer growth at 60° C. |
|---|---|
| 0.05 | 5 |
| 0.10 | 6.5 |
| 0.10 | 4.5 |
| 0 | 0.5 |

What is claimed is:

1. A process which comprises adding a shortstopping amount of N-alkyl-N-arylhydroxylamine in which amine the alkyl radical contains form 1 to 18 carbon atoms and the aryl radical contains from 6 to 20 carbon atoms to an emulsion polymerization latex containing an addition polymer formed from a vinyl monomer capable of free radical polymerization.

2. A process of claim 1 wherein the N-alkyl group has 1–10 carbon atoms and the N-aryl group has 1–12 carbon atoms.

3. A process of claim 2 wherein the N-alkyl group has 1 to about 8 carbon atoms and the N-aryl group is phenyl or a substituted phenyl.

4. A process of claim 1 wherein the N-alkyl-N-arylhydroxylamine is N-ethyl-N-phenylhydroxylamine.

5. A process of claim 1 wherein the vinyl monomer is butadiene.

6. A process of claim 1 wherein the vinyl monomer is a mixture of styrene and butadiene.

7. A process of claim 1 wherein the shortstopping amount of N-alkyl-N-arylhydroxylamine is 0.10 to 0.2 part per hundred parts of the vinyl monomer.

References Cited
UNITED STATES PATENTS

| | | | |
|---|---|---|---|
| 3,222,334 | 12/1965 | Demme | 260—84.7 |
| 3,341,487 | 9/1967 | Albert et al. | 260—29.7 |

MORRIS LIEBMAN, Primary Examiner

T. DE BENEDICTIS, SR., Assistant Examiner

U.S. Cl. X.R.

260—29.6 N, 34.2, 82.1, 84.7, 88.2 E, 88.2 S